United States Patent
Park et al.

(10) Patent No.: US 9,947,909 B2
(45) Date of Patent: Apr. 17, 2018

(54) ELECTRODE ASSEMBLY AND POLYMER SECONDARY BATTERY CELL INCLUDING THE SAME

(71) Applicant: LG CHEM, LTD., Seoul (KR)

(72) Inventors: Ji Won Park, Daejeon (KR); Myung Hoon Ko, Daejeon (KR); Seung Ho Na, Daejeon (KR); Chang Bum Ahn, Daejeon (KR)

(73) Assignee: LG CHEM. LTD., Seoul (KR)

( * ) Notice: Subject to any disclaimer, the term of this patent is extended or adjusted under 35 U.S.C. 154(b) by 209 days.

(21) Appl. No.: 14/470,624

(22) Filed: Aug. 27, 2014

(65) Prior Publication Data
US 2014/0370362 A1    Dec. 18, 2014

Related U.S. Application Data

(63) Continuation of application No. PCT/KR2014/001265, filed on Feb. 17, 2014.

(30) Foreign Application Priority Data

Feb. 15, 2013 (KR) .................. 10-2013-0016511
Feb. 17, 2014 (KR) .................. 10-2014-0017700

(51) Int. Cl.
*H01M 2/16* (2006.01)
*H01M 10/04* (2006.01)
(Continued)

(52) U.S. Cl.
CPC ....... *H01M 2/1686* (2013.01); *H01M 2/1061* (2013.01); *H01M 2/14* (2013.01);
(Continued)

(58) Field of Classification Search
CPC ......... H01M 10/0413; H01M 10/0436; H01M 10/0468; H01M 10/0565; H01M 10/0585; H01M 2/14; H01M 2/1686; H01M 2/1061
See application file for complete search history.

(56) References Cited

U.S. PATENT DOCUMENTS 7,384,705 B2    6/2008  Kezuka et al.
2001/0005561 A1*  6/2001  Yamada .............. H01M 2/1066
                                                    429/152

(Continued)

FOREIGN PATENT DOCUMENTS

CN        1457517 A      11/2003
CN      101002347 A       7/2007
(Continued)

OTHER PUBLICATIONS

KR100440934B1 (KR10-2003-006960 Publication) machine translation.*
(Continued)

*Primary Examiner* — Milton I Cano
*Assistant Examiner* — Lingwen R Zeng
(74) *Attorney, Agent, or Firm* — Birch, Stewart, Kolasch & Birch, LLP

(57) ABSTRACT

An electrode assembly includes a cell stack part having a structure of steps obtained by stacking at least two groups of radical units having different sizes or having different geometric shapes according to the size or the geometric shapes. The radical unit has a combined structure into one body by alternately same number of electrodes and separators, and each step of the cell stack part has a structure in which one kind of radical units is disposed once or repeatedly, or a structure in which at least two kinds of radical units are disposed. The one kind of radical unit has a four-layered structure of first electrode, first separator, second electrode (Continued)

and second separator sequentially stacked or a repeating structure of the four-layered structure. Each of the at least two kinds of radical units are stacked by ones to form the four-layered structure or the repeating structure.

24 Claims, 20 Drawing Sheets

(51) Int. Cl.
    *H01M 10/0565* (2010.01)
    *H01M 10/0585* (2010.01)
    *H01M 2/14* (2006.01)
    *H01M 2/10* (2006.01)

(52) U.S. Cl.
    CPC ... *H01M 10/0413* (2013.01); *H01M 10/0436* (2013.01); *H01M 10/0468* (2013.01); *H01M 10/0565* (2013.01); *H01M 10/0585* (2013.01)

(56) References Cited

U.S. PATENT DOCUMENTS

| | | | |
|---|---|---|---|
| 2002/0160257 A1* | 10/2002 | Lee | H01M 6/46 429/130 |
| 2003/0013012 A1 | 1/2003 | Ahn et al. | |
| 2003/0104273 A1 | 6/2003 | Lee et al. | |
| 2004/0048152 A1 | 3/2004 | Yata et al. | |
| 2005/0158593 A1* | 7/2005 | Minehisa | H01M 8/04156 429/414 |
| 2006/0046149 A1 | 3/2006 | Yong et al. | |
| 2007/0254199 A1 | 11/2007 | Shu et al. | |
| 2008/0044689 A1 | 2/2008 | Shu et al. | |
| 2008/0305398 A1 | 12/2008 | Komiya | |
| 2009/0291360 A1 | 11/2009 | Kim et al. | |
| 2010/0003590 A1* | 1/2010 | Park | H01M 2/1673 429/144 |
| 2010/0190081 A1 | 7/2010 | Park et al. | |
| 2010/0304198 A1* | 12/2010 | Ahn | H01M 10/0459 429/94 |
| 2011/0223465 A1 | 9/2011 | Kanda | |
| 2011/0281172 A1 | 11/2011 | Yong et al. | |
| 2012/0015236 A1 | 1/2012 | Spare | |
| 2012/0121964 A1 | 5/2012 | Park et al. | |
| 2012/0196167 A1 | 8/2012 | Kim et al. | |
| 2012/0225345 A1 | 9/2012 | Kim | |
| 2013/0059179 A1 | 3/2013 | Hosaka et al. | |
| 2013/0183570 A1 | 7/2013 | Yong et al. | |
| 2013/0209861 A1 | 8/2013 | Yong et al. | |
| 2013/0224586 A1 | 8/2013 | Nagai et al. | |
| 2014/0011070 A1 | 1/2014 | Kim et al. | |
| 2014/0134472 A1 | 5/2014 | Kim | |

FOREIGN PATENT DOCUMENTS

| | | |
|---|---|---|
| CN | 101771165 A | 7/2010 |
| CN | 102760905 A | 10/2012 |
| CN | 202585648 U | 12/2012 |
| EP | 1083618 A1 | 3/2001 |
| JP | 2000-173621 A | 6/2000 |
| JP | 2000-311717 A | 11/2000 |
| JP | 2001-28275 A | 1/2001 |
| JP | 2001-167743 A | 6/2001 |
| JP | 2002-151159 A | 5/2002 |
| JP | 2002-198098 A | 7/2002 |
| JP | 2002-198099 A | 7/2002 |
| JP | 2003-523060 A | 7/2003 |
| JP | 2006-185662 A | 7/2006 |
| JP | 2008-204706 A | 9/2008 |
| JP | 2009-540523 A | 11/2009 |
| JP | 2011-086506 A | 4/2011 |
| JP | 2013-524460 A | 6/2013 |
| KR | 100440934 B1 * | 7/2004 |
| KR | 10-2004-0082874 A | 9/2004 |
| KR | 10-2008-0005629 A | 1/2008 |
| KR | 10-2011-0037781 A | 4/2011 |
| KR | 10-2011-0112241 A | 10/2011 |
| TW | 499767 B | 8/2002 |
| TW | 200743245 A | 11/2007 |
| TW | 200812138 A | 3/2008 |
| TW | I344234 B | 6/2011 |
| WO | WO 2006/025662 A1 | 3/2006 |
| WO | WO 2008/002024 A1 | 1/2008 |
| WO | WO 2010/113273 A1 | 10/2010 |
| WO | WO 2011/145608 A1 | 11/2011 |
| WO | WO 2012/049778 A1 | 4/2012 |

OTHER PUBLICATIONS

International Search Report issued in PCT/KR2014/001265, dated Jun. 9, 2014.
Written Opinion of the International Searching Authority issued in PCT/KR2014/001265, dated Jun. 9, 2014.
Extended European Search Report for European Application No. 14751800.5, dated Apr. 14, 2015.

* cited by examiner

ELECTRODE ASSEMBLY AND POLYMER SECONDARY BATTERY CELL INCLUDING THE SAME

CROSS-REFERENCE TO RELATED APPLICATIONS

This application is a Continuation of PCT International Application No. PCT/KR2014/001265 filed on Feb. 17, 2014, which claims priority under 35 U.S.C. §119(a) to Patent Application Nos. 10-2013-0016511 filed on Feb. 15, 2013 and 10-2014-0017700 filed on Feb. 17, 2014 in the Republic of Korea, all of which are hereby expressly incorporated by reference into the present application.

BACKGROUND OF THE INVENTION

Field of the Invention

The present invention relates to an electrode assembly having a novel structure that is distinguished from a stack-type or a stack/folding type structure and a polymer secondary battery cell including the same, and more particularly, to an electrode assembly having an optimized size and using minimum separators and a polymer secondary battery cell including the same.

Description of the Related Art

Secondary batteries may be classified into various types according to the structure of an electrode assembly. Typically, secondary batteries may be classified into a stack-type, a wrapping-type (a jelly-roll type), or a stack/folding type according to the structure of an electrode assembly. The stack-type structure may be obtained by separately stacking electrode units cathode, a separator, and an anode) constituting the electrode assembly, and thus an accurate alignment of the electrode assembly is very difficult. In addition, a large number of processes are necessary for the manufacture of the electrode assembly. The stack/folding type structure is generally manufactured by using two lamination apparatuses and one folding apparatus, and thus the manufacture of the electrode assembly is very complicated. Particularly, in the stack/folding type structure, full cells or hi-cells are stacked through folding, and thus the alignment of the full cells or the hi-cells is difficult.

Meanwhile, as the design of electronic devices is diversified, the design of secondary batteries is correspondingly required to be diversified. Diverse secondary batteries having many steps have been developed based on a stack/folding type structure according to the requirement. However, based on the stack/folding type structure, separators may overlap doubly, or separator sheets folding hi-cells or full cells may not adhere closely to each step of an electrode assembly.

SUMMARY OF THE INVENTION

An aspect of the present disclosure provides an electrode assembly that is enabled to perform an accurate alignment and simple process through a novel structure that is distinguished from a stack-type or a stack/folding type structure, and a polymer secondary battery cell including the same.

Another aspect of the present disclosure provides an electrode assembly having a structure in which a plurality of steps is formed, having an optimized size and using minimum separators, and a polymer secondary battery cell including the same.

According to an aspect of the present disclosure, there is provided an electrode assembly including a cell stack part having a structure in which a plurality of steps are formed by stacking at least two groups of radical units having different sizes or at least two groups of radical units having different geometric shapes among radical units having the same size or the same geometric shapes. The radical unit has a combined structure into one body by alternately disposing a same number of electrodes and separators, and each step of the cell stack part has (a) a structure in which one kind of radical units is disposed once or repeatedly, or (b) a structure in which at least two kinds of radical units are disposed in a predetermined order. In addition, the one kind of radical unit of (a) has a four-layered structure in which a first electrode, a first separator, a second electrode and a second separator are sequentially stacked together or a repeating structure in which the four-layered structure is repeatedly stacked, and each of the at least two kinds of radical units of (b) are stacked by ones in the predetermined order to form the four-layered structure or the repeating structure in which the four-layered structure is repeatedly stacked.

The present disclosure may provide an electrode assembly that is enabled to perform an accurate alignment and simple process through a novel structure that is distinguished from a stack-type or a stack/folding type structure, having an optimized size and using minimum separators when a plurality of steps are formed, and a polymer secondary battery cell including the same.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present disclosure will now be described in detail with reference to the accompanying drawings. However, the present disclosure is not restricted or limited to the following exemplary embodiments.

An electrode assembly according to the present disclosure basically includes a cell stack part. Hereinafter, the cell stack part will be explained first.

Cell Stack Part

Each step of the cell stack part has (a) a structure obtained by disposing one kind of radical units once or repeatedly or (b) a structure obtained by disposing at least two kinds of radical units in a predetermined order, for example, alternately. This will be described below in more detail.

[Structure of Radical Unit]

Figure 1:
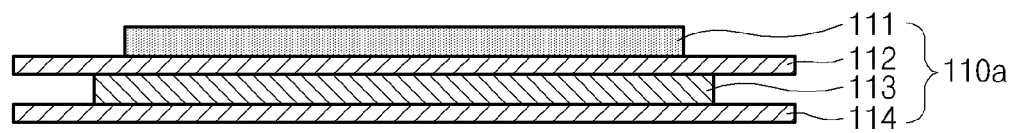
FIG. 1 is a side view illustrating a first structure of a radical unit according to the present disclosure.

In an electrode assembly according to the present disclosure, a radical unit is formed by alternately disposing electrodes and separators. Here, the same number of electrodes and separators are disposed. For example, as illustrated in FIG. 1 a radical unit 110a may be formed by stacking two electrodes 111 and 113 and two separators 112 and 114. Here, a cathode and an anode may naturally face each other through the separator. When the radical unit is formed as described above, an electrode 111 is positioned at one end of the radical unit (see the electrode 111 in FIGS. 1 and 2) and a separator 114 is positioned at the other end of the radical unit (see the separator 114 in FIGS. 1 and 2).

The electrode assembly according to the present disclosure is basically characterized in that the cell stack part or electrode assembly is formed by only stacking the radical units. That is, the present disclosure has a basic characteristic in that the cell stack part is formed by repeatedly stacking one kind of radical units or by stacking at least two kinds of radical units in a predetermined order. To realize the above-described characteristic, the radical unit may have the following structure.

Figure 2:
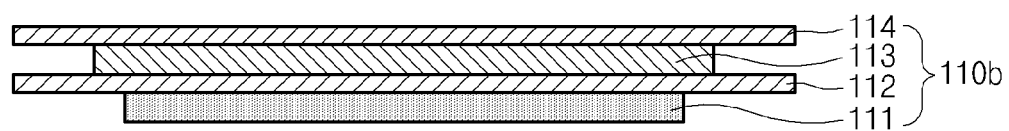
FIG. 2 is a side view illustrating a second structure of a radical unit according to the present disclosure.

First, the radical unit may be formed by stacking a first electrode, a first separator, a second electrode, and a second separator in sequence. In more detail, a first electrode 111, a first separator 112, a second electrode 113, and a second separator 114 may be stacked in sequence from an upper side to a lower side, as illustrated in FIG. 1, or from the lower side to the upper side, as illustrated in FIG. 2, to form radical units 110a and 110b. The radical unit having the above-described structure may be referred to as a first radical unit. Here, the first electrode 111 and the second electrode 113 may be opposite types of electrodes. For example, when the first electrode 111 is a cathode, the second electrode 113 may be an anode.

Figure 3:
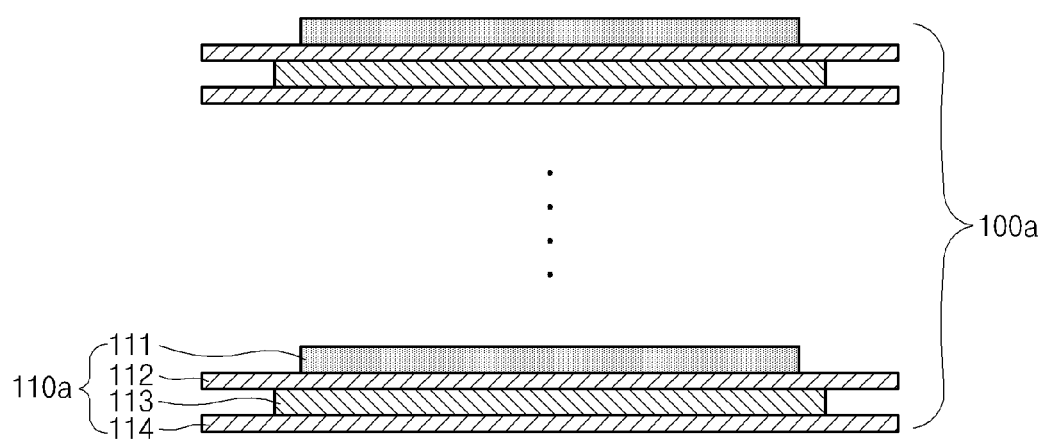
FIG. 3 is a side view illustrating a cell stack part formed by stacking the radical units of FIG. 1.

As described above, when the radical unit is formed by stacking the first electrode 111, the first separator 112, the second electrode 113, and the second separator 114 in sequence, a cell stack part 100a may be formed by only repeatedly stacking the one kind of radical units 110a, as illustrated in FIG. 3. Here, the radical unit may have an eight-layered structure or twelve-layered structure in addition to a four-layered structure. That is, the radical unit may have a repeating structure in which the four-layered structure is repeatedly disposed. For example, the radical unit may be formed by stacking the first electrode 111, the first separator 112, the second electrode 113, the second separator 114, the first electrode 111, the first separator 112, the second electrode 113, and the second separator 114 in sequence.

Alternatively, the radical unit may be formed by stacking the first electrode 111, the first separator 112, the second electrode 113, the second separator 114, the first electrode 111, and the first separator 112 in sequence, or by stacking the second electrode 113, the second separator 114, the first electrode 111, the first separator 112, the second electrode 113, and the second separator 114 in sequence. The radical unit having the former structure may be referred to as a second radical unit and the radical unit having the latter structure may be referred to as a third radical unit.

Figure 4:
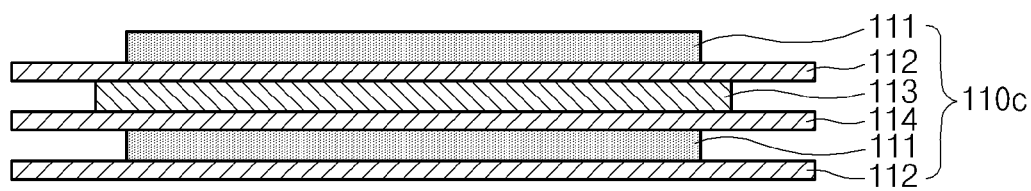
FIG. 4 is a side view illustrating a third structure of a radical unit according to the present disclosure.
Figure 5:
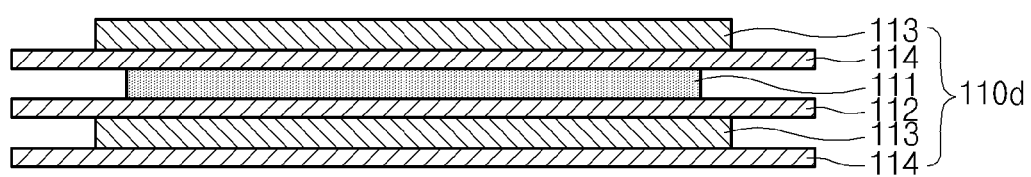
FIG. 5 is a side view illustrating a fourth structure of a radical unit according to the present disclosure.

In more detail, the second radical unit 100c may be formed by stacking the first electrode 111, the first separator 112, the second electrode 113, the second separator 114, the first electrode 111, and the first separator 112 in sequence from the upper side to the lower side, as illustrated in FIG. 4. Also, the third radical structure 110d may be formed by stacking the second electrode 113, the second separator 114, the first electrode 111, the first separator 112, the second electrode 113, and the second separator 114 in sequence from the upper side to the lower side, as illustrated in FIG. 5. As noted above, the stacking may be conducted in sequence from the lower side to the upper side.

Figure 6:
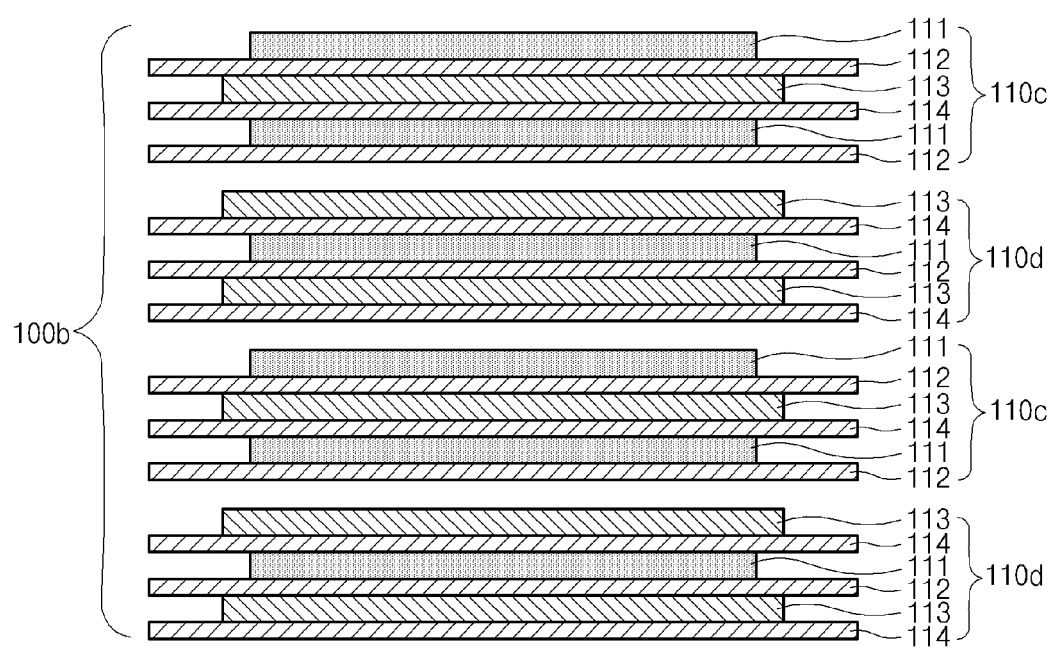
FIG. 6 is a side view illustrating a cell, stack part formed by stacking the radical units of FIG. 4 and the radical units of FIG. 5.

When only one of the second radical units 110c and one of the third radical units 110d are stacked, a repeating structure in which the four-layered structure is repeatedly stacked may be formed. Thus, when the second radical unit 110c and the third radical unit 110d are alternately stacked one by one, the cell stack part 100b may be formed by stacking only the second and third radical units, as illustrated in FIG. 6. For reference, when three kinds of radical units are prepared, the cell stack part may be formed by stacking the radical units in a predetermined order, for example, the first radical unit, the second radical unit, the third radical unit, the first radical unit again, the second radical unit, and the third radical unit.

As described above, the one kind of radical unit in the present disclosure has a four-layered structure in which a first electrode, a first separator, a second electrode and a second separator are sequentially stacked, or has a repeating structure in which the four-layered structure is repeatedly stacked. Also, at least two kinds of radical units in the present disclosure are stacked only by one in a predetermined order to form the four-layered structure or the repeating structure in which the four-layered structure is repeatedly disposed. For example, the first radical unit forms a four-layered structure by itself, and the second radical unit and the third radical unit form a twelve-layered structure by stacking one of each, that is, two radical units in total.

Thus, the cell stack part or electrode assembly may be formed only by stacking, that is, by repeatedly stacking one kind of radical units or by stacking at least two kinds of radical units in a predetermined order.

The cell stack part of the present disclosure may be formed by stacking the radical units one by one. That is, the cell stack part may be manufactured by forming the radical units and then stacking the radical units repeatedly or in a predetermined order. As described above, the cell stack part of the present disclosure may be formed by only stacking the radical units. Therefore, the radical units of the present disclosure may be very accurately aligned. When the radical unit is accurately aligned, the electrode and the separator may also be accurately aligned in the cell stack part. In addition, the cell stack part or electrode assembly may be improved in productivity. This is done because the manufacturing process is very simple.

[Manufacture of Radical Unit]

Figure 7:
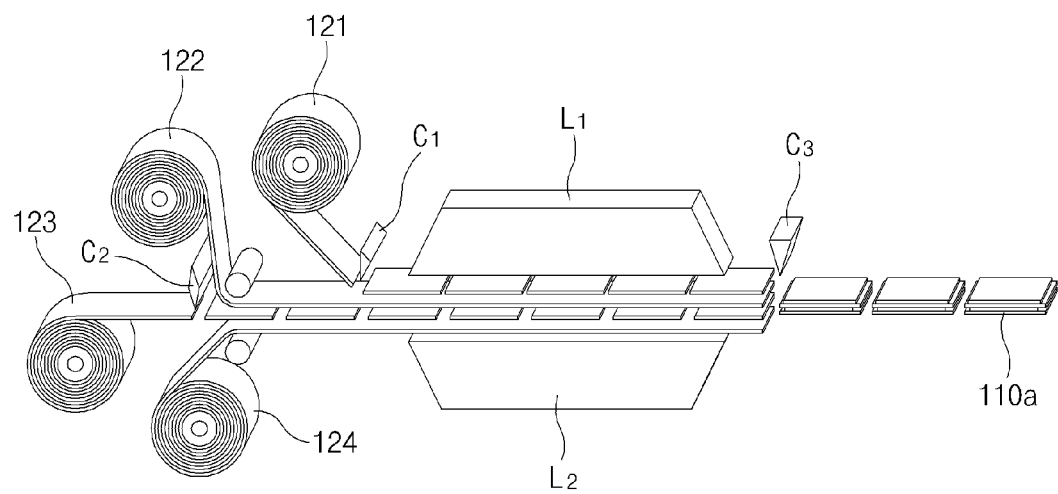
FIG. 7 is a process diagram illustrating a manufacturing process of a radical unit according to the present disclosure.

A manufacturing process of the first radical unit will be exemplarily described with reference to FIG. 7. First, a first electrode material 121, a first separator material 122, a second electrode material 123 and a second separator material 124 are prepared. Here, the first separator material 122 and the second separator material 124 may be the same. The first electrode material 121 is cut into a certain size through a cutter C1, and the second electrode material 123 is cut into a certain size through a cutter C2. Then, the first electrode material 121 is stacked on the first separator material 122, and the second electrode material 123 is stacked on the second separator material 124.

Then, it is preferable that the electrode materials and the separator materials are attached to each other through laminators L1 and L2. Through the attachment, a radical unit in which the electrodes and the separators are integrally combined may be formed. The combining method may be diverse. The laminators L1 and L2 may apply pressure to the materials or apply pressure and heat to the materials to attach the materials to each other. Because of the attachment, the stacking of the radical units may be more easily performed while manufacturing the cell stack part. Also, the alignment of the radical units may be also easily accomplished because of the attachment. After the attachment, the first separator material 122 and the second separator material 124 are cut into a certain size through a cutter C3 to manufacture the radical unit 110a. During this process, the edges of the separators are not joined with each other.

As described above, the electrode may be attached to the adjacent separator in the radical unit. Alternatively, the separator may be attached to the adjacent electrode. Here, it is preferable that an entire surface of the electrode facing the adjacent separator is attached to the adjacent separator. In this case, the electrode may be stably fixed to the separator. Typically, the electrode has a size less than that of the separator.

For this, an adhesive may be applied to the separator. However, when the adhesive is used, it is necessary to apply the adhesive over an adhesion surface of the separator in a mesh or dot shape. This is because if the adhesive is closely applied to the entire adhesion surface, reactive ions such as lithium ions may not pass through the separator. Thus, when the adhesive is used, it is difficult to allow the overall surface of the electrode to closely attach to the adjacent separator.

Alternatively, use of the separator including the coating layer having adhesive strength makes it possible to generally attach the electrode to the separator. This will be described below in more detail. The separator may include a porous separator base material such as a polyolefin-based separator base material and a porous coating layer that is generally applied to one side or both sides of the separator base material. Here, the coating layer may be formed of a mixture of inorganic particles and a binder polymer that binds and fixes the inorganic particles to each other.

Here, the inorganic particles may improve thermal stability of the separator. That is, the inorganic particles may prevent the separator from being contracted at a high temperature. In addition, the binder polymer may fix the inorganic particles to improve mechanical stability of the separator. Also, the binder polymer may attach the electrode to the separator. Since the binder polymer is generally distributed in the coating layer, the electrode may closely adhere to the entire adhesion surface of the separator, unlike the foregoing adhesive. Thus, when the separator is used as described above, the electrode may be more stably fixed to the separator. To enhance the adhesion, the above-described laminators may be used.

The inorganic particles may have a densely packed structure to form interstitial volumes between the inorganic particles over the overall coating layer. Here, a pore structure may be formed in the coating layer by the interstitial volumes that are by inorganic particles. Due to the pore structure, even though the coating layer is formed on the separator, the lithium ions may smoothly pass through the separator. For reference, the interstitial volume defined by the inorganic particles may be blocked by the binder polymer according to a position thereof.

Here, the densely packed structure may be explained as a structure in which gravels are contained in a glass bottle. Thus, when the inorganic particles form the densely packed structure, the interstitial volumes between the inorganic particles are not locally formed in the coating layer, but generally formed in the coating layer. As a result, when each of the inorganic particles increases in size, the pore formed by the interstitial volume also increases in size. Due the above-described densely packed structure, the lithium ions may smoothly pass through the separator over the entire surface of the separator.

The radical units may also adhere to each other in the cell stack part. For example, if the adhesive or the above-described coating layer is applied to a bottom surface of the second separator 114 in FIG. 1, the other radical unit may adhere to the bottom surface of the second separator 114.

Here, the adhesive strength between the electrode and the separator in the radical unit may be greater than that between the radical units in the cell stack part. It is understood, that the adhesive strength between the radical units may not be provided. In this case, when the electrode assembly or the cell stack part is disassembled, the electrode assembly may be separated into the radical units due to a difference in the adhesive strength. For reference, the adhesive strength may be expressed as delamination strength. For example, the adhesive strength between the electrode and the separator may be expressed as a force required for separating the electrode from the separator. In this manner, the radical unit may not be bonded to the adjacent radical unit in the cell stack part, or may be bonded to the adjacent radical unit in the cell stack part by means of a bonding strength differing from a bonding strength between the electrode and the separator.

For reference, when the separator includes the above-described coating layer, it is not preferable to perform ultrasonic welding on the separator. Typically, the separator has a size greater than that of the electrode. Thus, there may be an attempt to bond the edge of the first separator 112 to the edge of the second separator 114 through the ultrasonic welding. Here, it is necessary to directly press an object to be welded through a horn in the ultrasonic welding. However, when the edge of the separator is directly pressed through the horn, the separator may adhere to the horn due to the coating layer having the adhesive strength. As a result, the welding apparatus may be broken down.

[Modification of Radical Unit]

Until now, the radical units having the same size have been explained. However, the radical units may have different sizes. When stacking the radical units having different sizes, cell stack parts having various shapes may be manufactured. Herein, the size of the radical unit is explained with reference to the size of the separator, because, typically, the separator is larger than the electrode.

Figure 8:
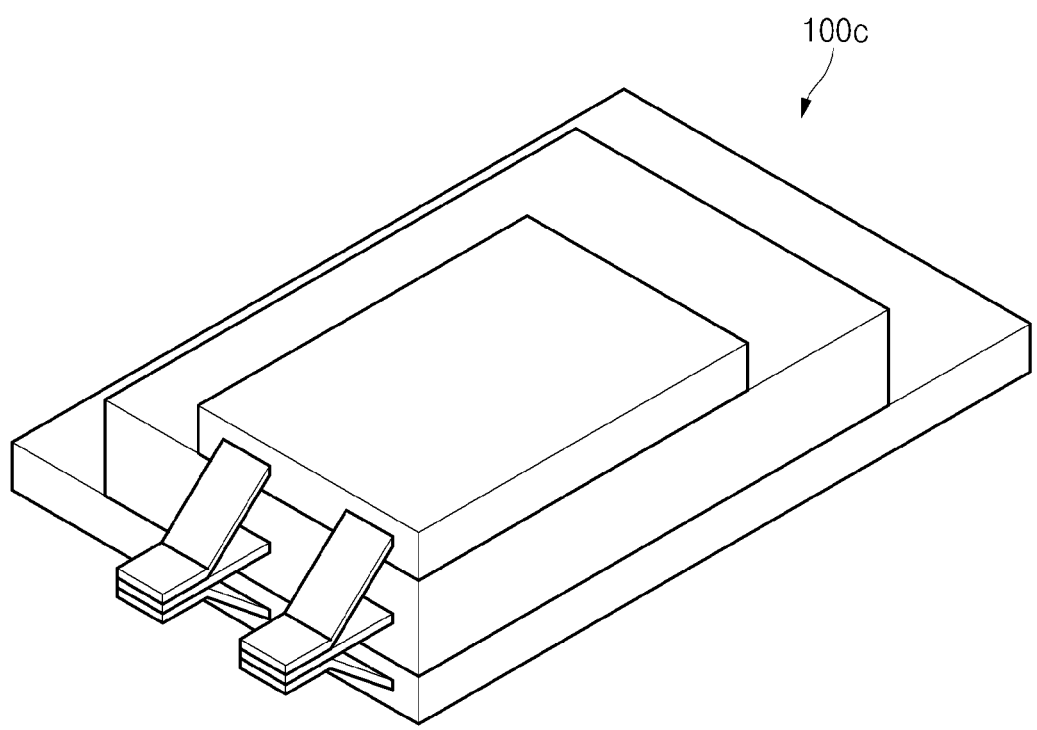
FIG. 8 is a perspective view illustrating a cell stack part formed by stacking radical units having different sizes.
Figure 9:
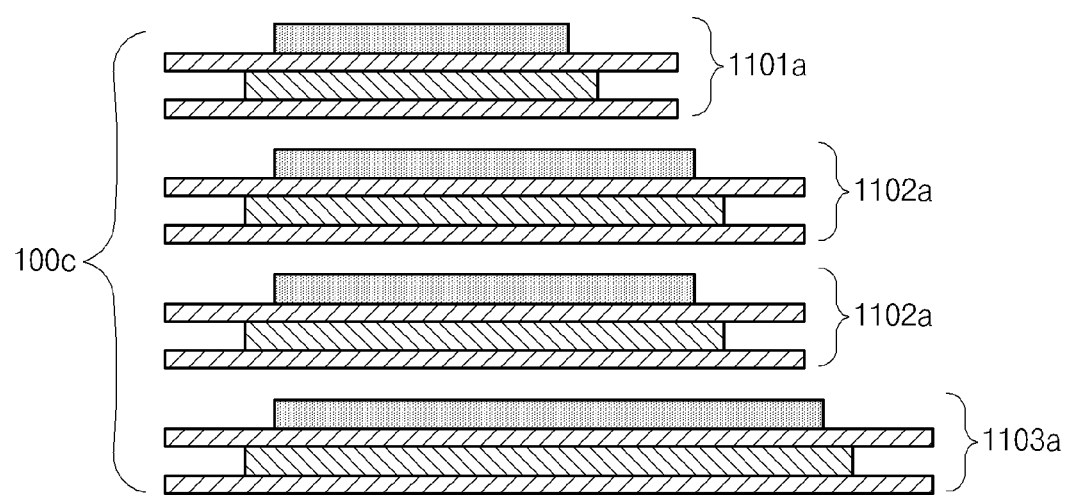
FIG. 9 is a side view illustrating the cell stack part of FIG. 8.

Referring to FIGS. 8 and 9, a plurality of radical units is prepared and may be classified into at least two groups having different sizes (see reference numerals 1101a, 1102a and 1103a in FIG. 9). By stacking the radical units according to their sizes, a cell stack part 100c having a structure of a plurality of steps may be formed. FIGS. 8 and 9 illustrate an embodiment in which the cell stack part includes three steps obtained by stacking the radical units 1101a, 1102a and 1103a classified into three groups, in which the radical units having the same size are stacked together, is illustrated. That is, in FIGS. 8 and 9, an embodiment in which three steps are formed by stacking radical units having the same size is illustrated. For reference, the radical units included, in one group may form two or more steps. In addition, one step may be formed by using one radical unit in a cell stack part.

When the plurality of steps is formed as described above, it is preferable that the radical unit has a structure of the first radical unit, that is, the above-described four-layered structure or the repeating structure in which the four-layered structure is repeatedly stacked. (Herein, the radical units are considered to be included in one kind of radical unit even though the radical units have the same stacked structures but have different sizes.)

Preferably, the same number of cathodes and the anodes are stacked in one step. Also, it is preferable that opposite electrodes face each other through a separator between one step and another step. For example, in case of the second and third radical units, two kinds of the radical units are necessary for forming one step.

However, in case of the first radical unit, only one kind of radical unit is necessary for forming one step as illustrated in FIG. 9. Thus, when the radical unit has the four-layered structure or the repeating structure in which the four-layered structure is repeatedly stacked, number of kinds of radical units may decrease even though a plurality of the steps is formed.

Also, in case of the second and the third radical units, at least one of the two kinds of the radical units are necessary to be stacked to form one step. Thus, the one step may have at least a twelve-layered structure. However, in case of the first radical unit, only one kind of radical unit is necessary to be stacked to form one step. Thus, one step may have at least a four-layered structure. As a result, when the radical unit has the four-layered structure or the repeating structure in which the four-layered structure is repeatedly stacked, the thickness of each step may be easily controlled when forming a plurality of steps.

Figure 10:
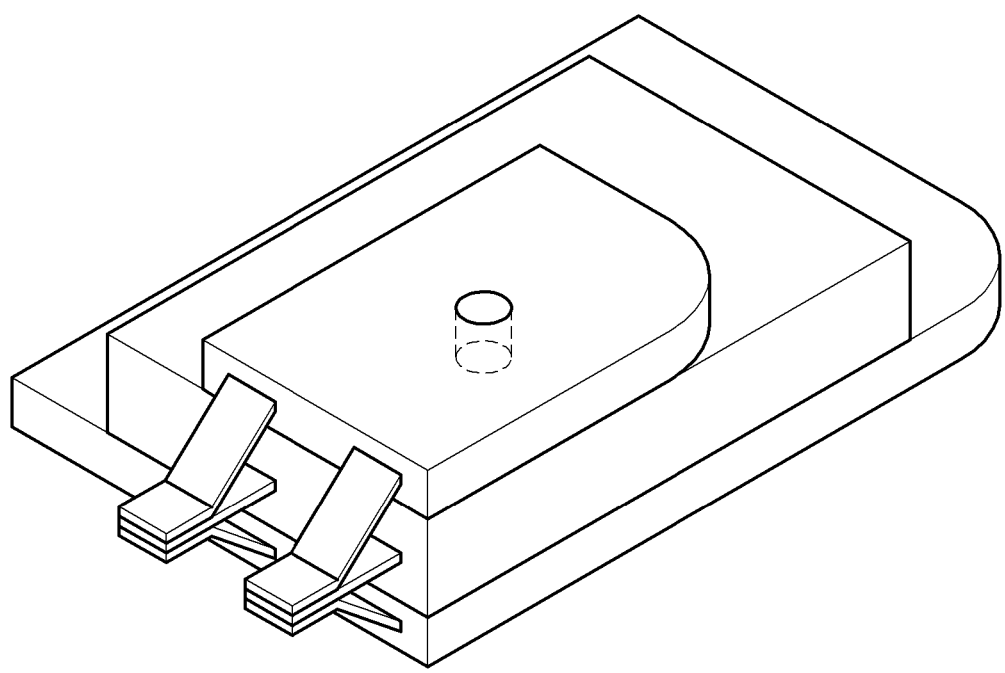
FIG. 10 is a perspective view illustrating a cell, stack part formed by stacking radical units having different geometric shapes.

The radical units may have not only different sizes but also different geometric shapes. For example, the radical units may have different sizes and different edge shapes, and may or may not have a through hole as illustrated in FIG. 10. More particularly, as illustrated in FIG. 10, a plurality of radical units classified into three groups may form three steps by stacking the radical units having the same geometric shapes.

For this, the radical units may be classified into at least two groups (each of the groups has different geometric shape). Similarly, the radical unit may preferably have the four-layered structure or the repeating structure in which the four-layered structures are repeatedly stacked, that is, the structure of the first radical unit. (Herein, the radical units are considered to be included in one kind of radical unit even though the radical units have the same stacked structure but have different geometric shapes.)

[Auxiliary Unit]

The cell stack part may further include at least one among a first auxiliary unit and a second auxiliary unit. First, the first auxiliary unit will be described below. In the present disclosure, an electrode is positioned at one end of the radical unit, and a separator is positioned at the other end of the radical unit. When the radical units are stacked in sequence, the electrode may be positioned at the uppermost portion or at the lowermost portion of the cell stack part (see reference numeral 116 in FIG. 11, and this electrode may be referred to as a terminal electrode 116). The first auxiliary unit is additionally stacked on the terminal electrode.

Figure 11:
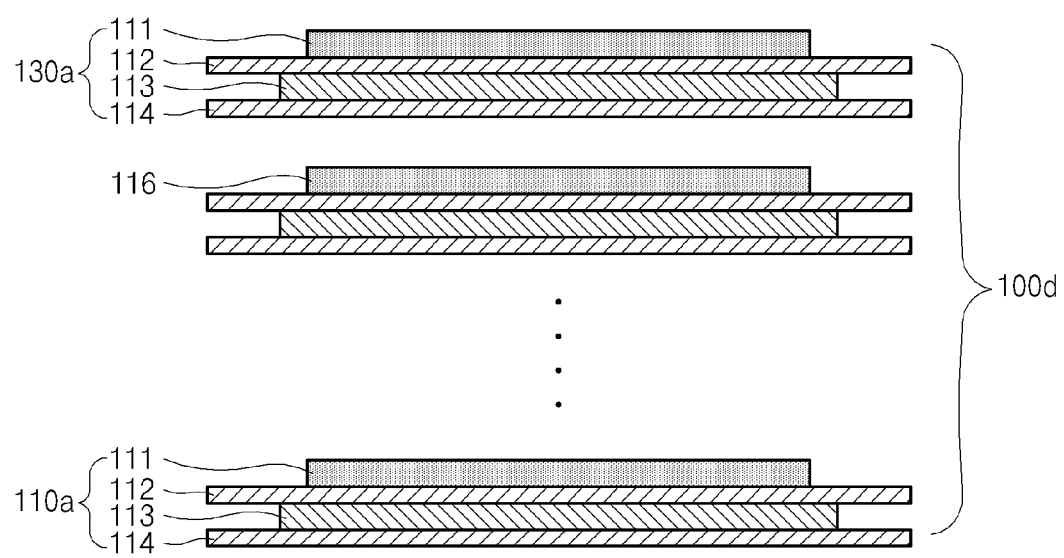
FIG. 11 is a side view illustrating a first structure of a cell stack part including a radical unit and a first auxiliary unit according to the present disclosure.

In more detail, when the terminal electrode 116 is a cathode, the first auxiliary unit 130a may be formed by stacking outward from the terminal electrode 116, a separator 114, an anode 113, a separator 112, and a cathode 111 in sequence, as illustrated in FIG. 11. On the other hand, when the terminal electrode 116 is an anode, the first auxiliary unit 130b may be formed by stacking outward from the terminal electrode 116, the separator 114, and the cathode 113 in sequence, as illustrated in FIG. 12.

Figure 12:
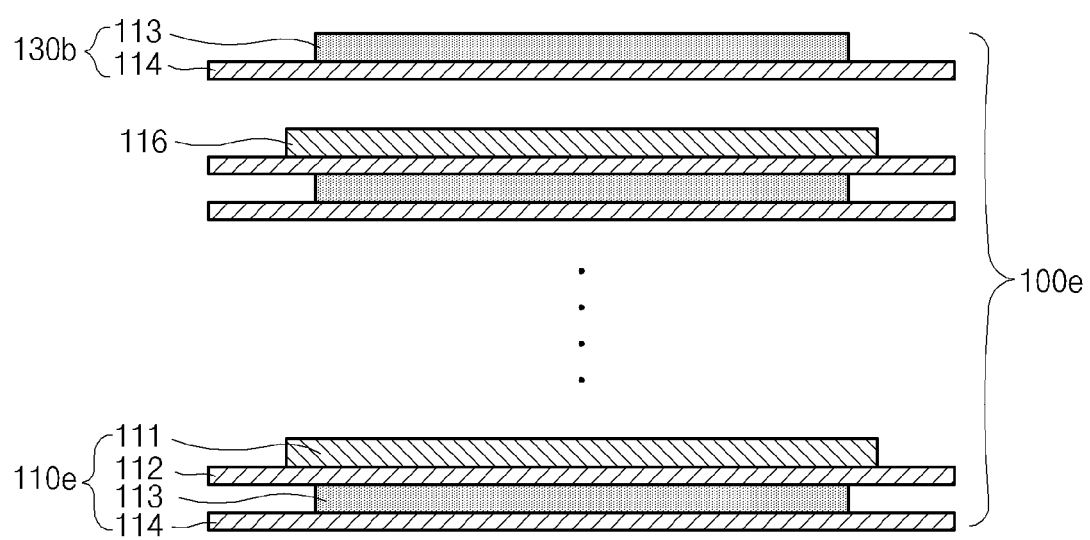
FIG. 12 is a side view illustrating a second structure of a cell stack part including a radical unit and a first auxiliary unit according to the present disclosure.

In the cell stack parts 100d and 100e, a cathode may be positioned at the outermost portion of a terminal electrode through the first auxiliary units 130a and 130b, as illustrated in FIGS. 11 and 12. In this case, in the cathode positioned at the outermost portion, that is, the cathode of the first auxiliary unit, an active material layer is preferably coated on only one side facing the radical unit (one side facing downward in FIG. 11) among both sides of the current collector. When the one side of the current collector is coated with the active material layer as described above, the active material, layer is not positioned at the outermost portion of the cell stack part. Thus, waste of the active material layer may be prevented. For reference, since the cathode emits, for example, lithium ions, when the cathode is positioned at the outermost portion, the capacity of a battery may be improved.

For reference, the first auxiliary unit may preferably have the same size as the radical unit in which the terminal electrode is positioned in addition, the second auxiliary unit, which will be described later, also may preferably have, the same size as the radical unit in which the terminal electrode is positioned.

Next, a second auxiliary unit will be described below. The second auxiliary unit performs the same function as the first auxiliary unit, which will be described below in more detail. In the present disclosure, an electrode is positioned at one end of the radical unit, and a separator is positioned at the other end of the radical unit. When the radical units are stacked in sequence, the separator may be positioned at the uppermost portion or at the lowermost portion of the cell stack part (see reference numeral 117 in FIG. 13, and this separator may be referred to as a terminal separator 117). The second auxiliary unit is additionally stacked on the terminal separator.

Figure 13:
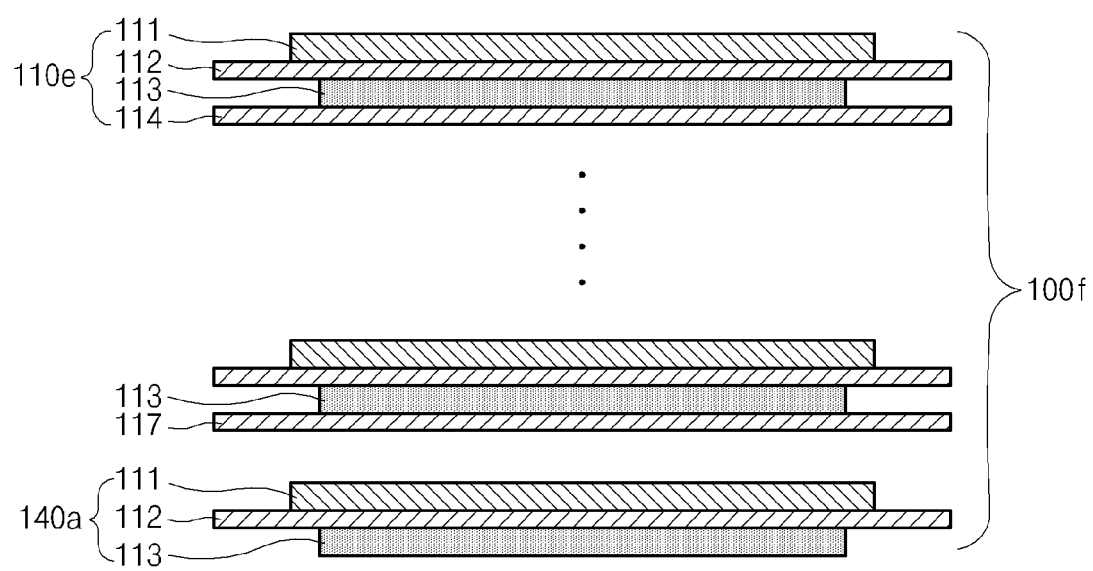
FIG. 13 is a side view illustrating a third structure of a cell stack part including a radical unit and a second auxiliary unit according to the present disclosure.

In more detail, when she electrode 113 contacting the terminal, separator 117 is a cathode in the radical unit, the second auxiliary unit 140a may be formed by stacking from she terminal separator 117, an anode 111, a separator 112, and a cathode 113 in sequence, as illustrated in FIG. 13. On the other hand, when the electrode 113 contacting the terminal separator 117 is an anode in the radical unit, the second auxiliary unit 140b may be formed as the cathode 111, as illustrated in FIG. 14.

Figure 14:
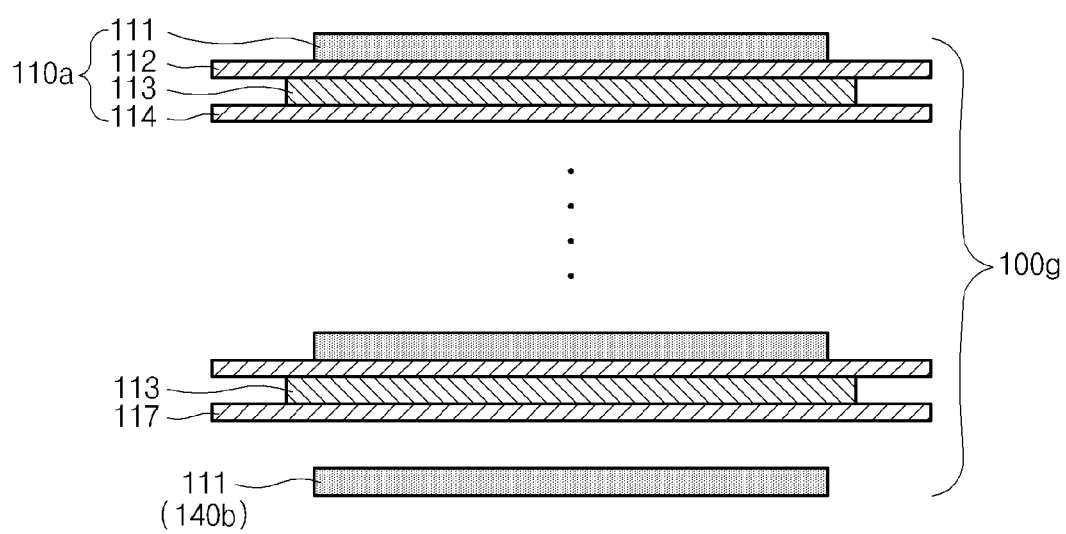
FIG. 14 is a side view illustrating a fourth structure of a cell stack part including a radical unit and a second auxiliary unit according to the present disclosure.

In the cell stack parts 100f and 100g, a cathode may be positioned at the outermost portion of a terminal separator through the second auxiliary units 140a and 140b, as illustrated in FIGS. 13 and 14. In this case, in the cathode positioned at the outermost portion, that is, the cathode of the second auxiliary unit, an active material layer is preferably coated on only one side facing the radical unit (one side facing upward in FIG. 13) among both sides of the current collector, as similar to the cathode of the first auxiliary unit.

Figure 15:
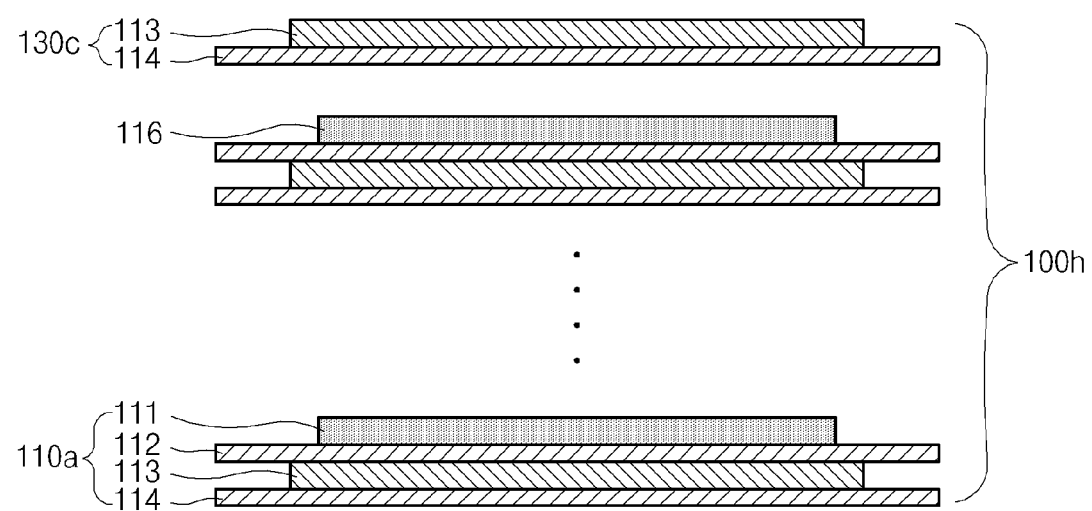
FIG. 15 is a side view illustrating a fifth structure of a cell stack part including a radical unit and a first auxiliary unit according to the present disclosure.

The first auxiliary unit and the second auxiliary unit may have different structures from those described above. First, the first auxiliary unit will be described below. When the terminal electrode 116 is a cathode as illustrated in FIG. 15, the first auxiliary unit 130c may be formed by stacking from the terminal electrode 116, a separator 114, and an anode 113 in sequence. On the other hand, when the terminal electrode 116 is an anode as illustrated in FIG. 16, the first auxiliary unit 130d may be formed by stacking from the terminal electrode 116, a separator 114, a cathode 113, a separator 112, and an anode 111 in sequence.

Figure 16:
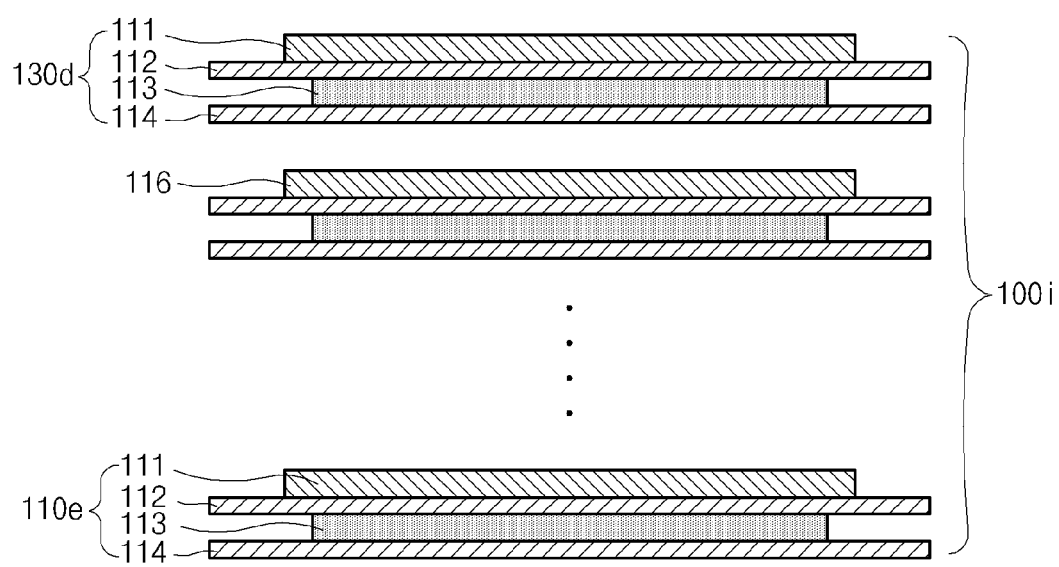
FIG. 16 is a side view illustrating a sixth structure of stack part including a radical unit and a first auxiliary unit according to the present disclosure.

In the cell stack parts 100h and 100i, an anode may be positioned at the outermost portion of the terminal electrode through de first auxiliary units 130c and 130d, as illustrated in FIGS. 15 and 16.

Figure 17:
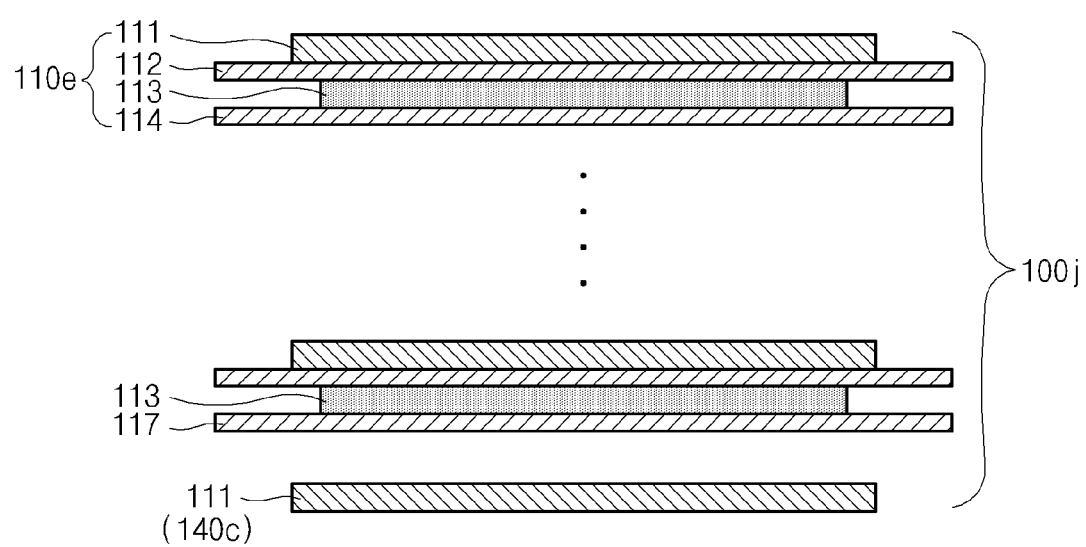
FIG. 17 is a side view illustrating a seventh structure of a cell stack part including a radical unit and a second auxiliary unit according to the present disclosure.
Figure 18:
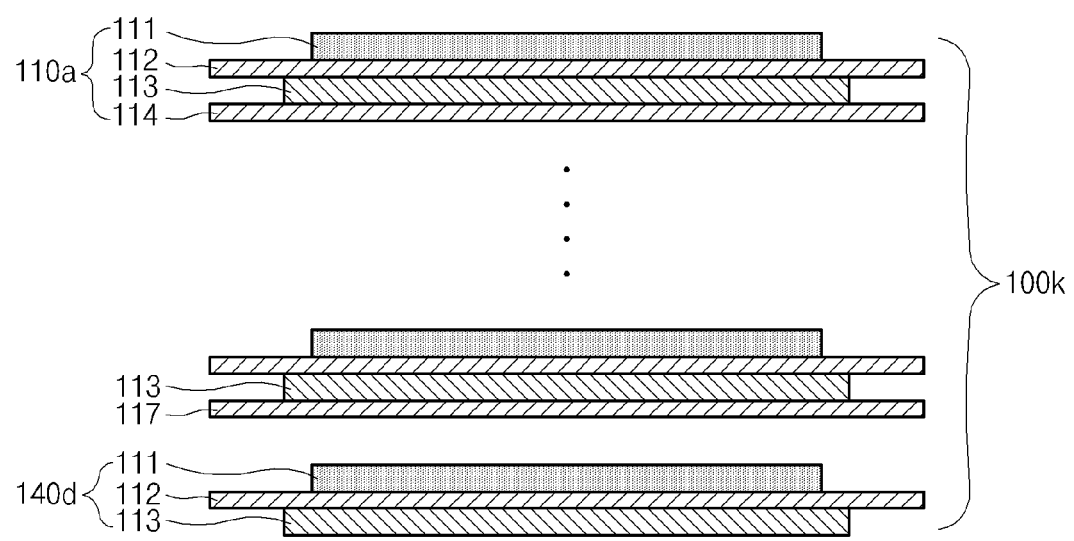
FIG. 18 is a side view illustrating an eighth structure of a cell stack part including a radical unit and a second auxiliary unit according to the present disclosure.

Next, the second auxiliary unit will be described below. As illustrated in FIG. 17, when the electrode 113 contacting the terminal separator 117 is a cathode in the radical unit, the second auxiliary unit 140c may be formed as an anode 111. As illustrated in FIG. 18, when the electrode 113 contacting the terminal separator 117 is an anode in the radical unit, the second auxiliary unit 140d may be formed by stacking from the terminal separator 117, the cathode 111, the separator 112, and the anode 113 in sequence. In the cell stack parts 100j and 100k, an anode may be positioned at the outermost portion of the terminal separator through the second auxiliary units 140c and 140d, as illustrated in FIGS. 17 and 18.

Figure 19:
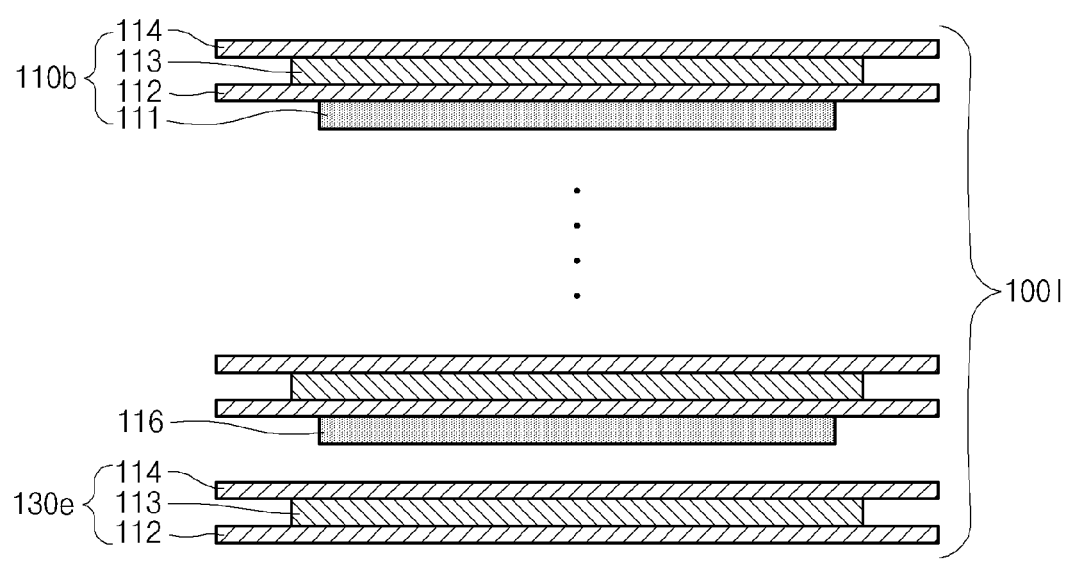
FIG. 19 is a side view illustrating a ninth structure of a cell stack part including a radical unit and a first auxiliary unit according to the present disclosure.

For reference, an anode may make a reaction with an aluminum layer of a battery case (for example, a pouch-type case) due to potential difference. Thus, the anode is preferably insulated from the battery case by means of a separator. For this, the first and second auxiliary units in FIGS. 15 to 18 may further include a separator at the outer portion of the anode. For example, the first auxiliary unit 130e in FIG. 19 may further include a separator 112 at the outermost, portion thereof when compared with the first auxiliary unit 130c in FIG. 15. For reference, when the auxiliary unit includes the separator, the alignment of the auxiliary units in the radical unit may be easily performed.

Figure 20:
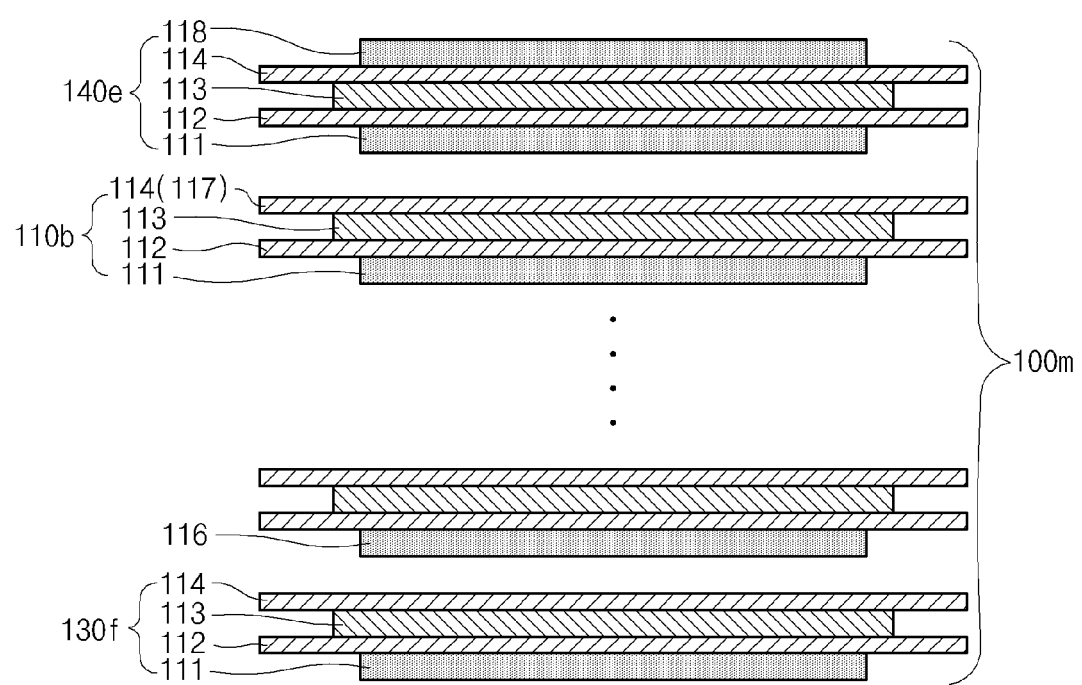
FIG. 20 is a side view illustrating a tenth structure of a cell stack part including a radical unit, a first auxiliary unit, and a second auxiliary unit according to the present disclosure.

A cell stack part 100m may be formed as illustrated in FIG. 20. A radical unit 110b may be formed by stacking from the lower portion to the upper portion, a first electrode 111, a first separator 112, a second electrode 113, and a second separator 114 in sequence. In this case, the first electrode 111 may be a cathode, and the second electrode 113 may be an anode.

A first auxiliary unit 130f may be formed by stacking from the terminal, electrode 116, the separator 114, the anode 113, the separator 112 and the cathode 111 in sequence. In this case, in the cathode 111 of the first auxiliary unit 130f, only one side of a current collector facing the radical unit 110b among both sides of the current collector may be coated with an active material layer.

Also, a second auxiliary unit 140e may be formed by stacking from the terminal separator 117, the cathode 111 (the first cathode), she separator 112, the anode 113, she separator 114, and the cathode 118 (the second cathode) in sequence. In this case, in the cathode 118 (the second cathode) of the second auxiliary unit 140e positioned, at the outermost portion, only one side of a current collector facing the radical unit 110b among both sides of the current collector may be coated with an active material layer.

Figure 21:
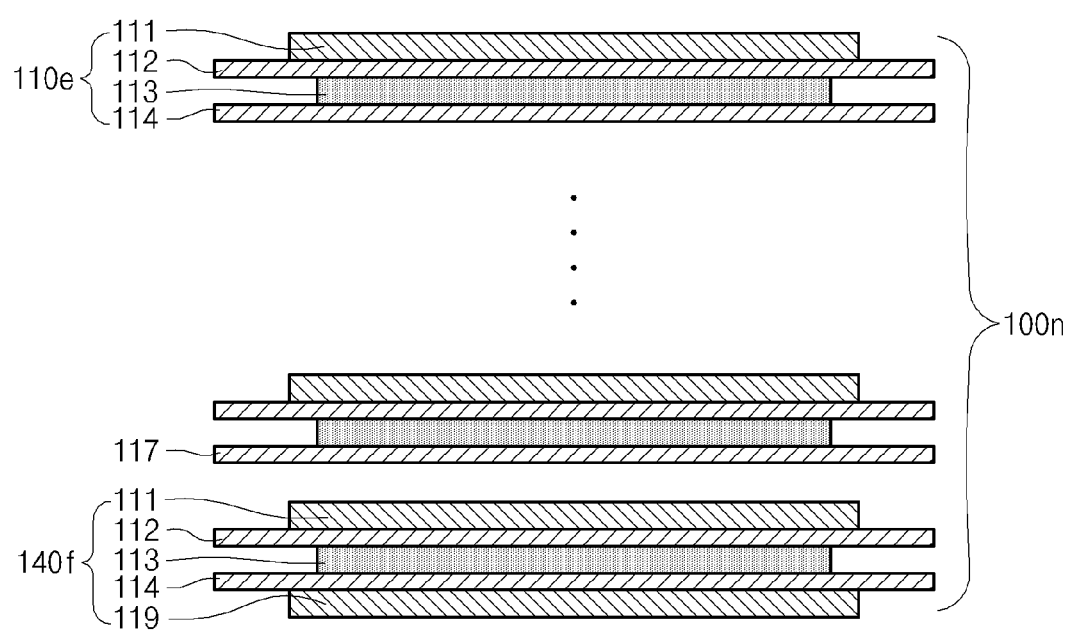
FIG. 21 is a side view illustrating an eleventh structure of a cell stack part including a radical unit and a second auxiliary unit according to the present disclosure.

Finally, a cell stack part 100n may be formed as illustrated in FIG. 21. In this case, a radical unit 110e may be formed by stacking from the upper portion to the lower portion, a first electrode 111, a first separator 112, a second electrode 113, and a second separator 114 in sequence. In this case, the first electrode 111 may be an anode, and the second electrode 113 may be a cathode. Also, a second auxiliary unit 140f may be formed by stacking from the terminal separator 117, the anode 111, the separator 112, the cathode 113, the separator 114, and the anode 119 in sequence.

Polymer Secondary Battery Cell

In the present disclosure, a polymer secondary battery cell including the above-described electrode assembly may be manufactured. That is, the polymer secondary battery cell, in the present disclosure includes a cell stack part, a fixing part for fixing the radical units of the cell, stack part, and a pouch case or receiving the cell stack part and the fixing part.

Figure 22:
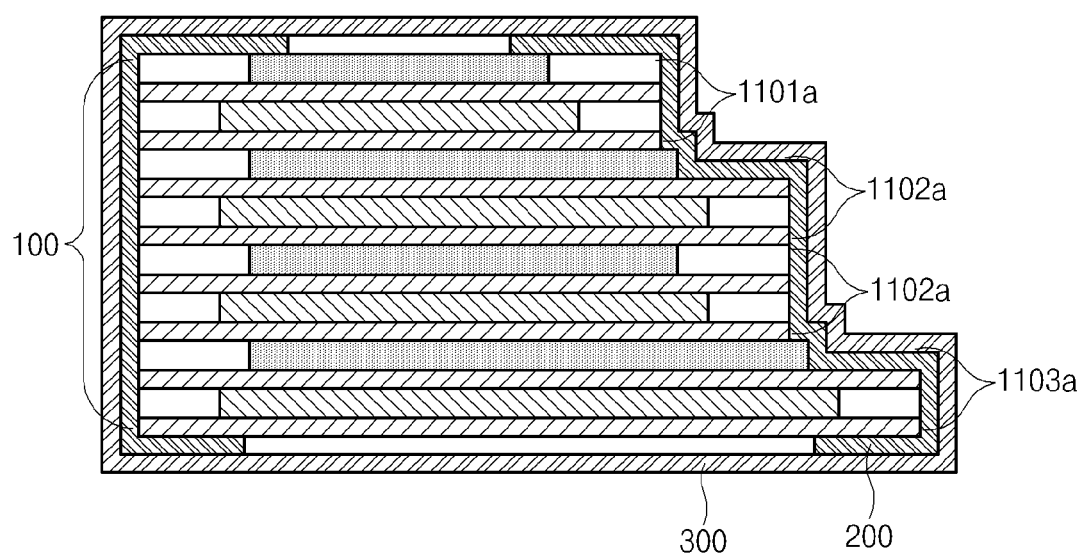
FIG. 22 is a side view illustrating a polymer secondary battery cell including an electrode assembly according to the present disclosure.

For example, the polymer secondary battery cell may include a cell stack part 100 having a plurality of steps, a fixing part 200 attached from the top surface to the bottom surface of the cell stack part 100, wherein the fixing part 200 is folded into multiple steps for close attachment to the cell stack part 100, and a pouch case 300 receiving the cell stack part 100 to which the fixing part 200 is attached, as illustrated in FIG. 22.

The fixing part may be extended closely from the top surface of the cell stack part 100 along the side surface of the cell stack part 100 to the bottom, surface of the cell stack part 100, as illustrated in FIG. 22. Alternatively, the fixing part may be extended closely from the top surface of the cell stack part to the top surface of the cell stack part again, or from the bottom surface of the cell stack part to the bottom surface of the cell stack part again. The fixing part may wrap the cell stack part by at least one lap.

Here, the fixing part 200 may be a polymer tape exhibiting adhesiveness when wet with water.

Therefore, the polymer secondary battery cell according to the present disclosure, includes an electrode assembly having a novel structure that is distinguished from a stack-type or a stack/folding type structure. The stacking method of the electrode assembly may be simplified, and commercial value of a product may be improved.

While the present invention has been shown and described in connection with the exemplary embodiments, it will be apparent to those skilled in the art that modifications and variations can be made without departing from the spirit and scope of the invention as defined by the appended claims.

What is claimed is:

1. An electrode assembly, comprising:
   a cell stack part having a structure of a plurality of steps obtained by stacking radical units according to a size or geometric shape thereof, the radical units being classified into at least two groups having different sizes or geometric shapes; and
   a fixing part for fixing the cell stack part,
   wherein the radical unit has a same number of electrodes and separators which are alternately disposed and integrally combined,
   wherein each step of the cell stack part has (a) a structure in which one kind of radical unit is disposed once or repeatedly or (b) a structure in which at least two kinds of radical units are disposed in a predetermined order,
   wherein the one kind of radical unit of (a) has a four-layered structure in which a first electrode, a first separator, a second electrode and a second separator are sequentially stacked together or a repeating structure in which the four-layered structure is repeatedly stacked,
   wherein each of the at least two kinds of radical units of (b) are stacked by ones in the predetermined order to form the four-layered structure or the repeating structure in which the four-layered structure is repeatedly stacked,
   wherein the fixing part exhibits adhesiveness when wet with water,
   wherein the fixing part is adhered to one or more steps of the plurality of steps of the cell stack part, and
   wherein a portion of an outermost electrode of the cell stack part is covered by the fixing part and a portion of the outermost electrode of the cell stack part is not covered by the fixing part.

2. The electrode assembly of claim 1, wherein edge of the separator is not joined with edge of an adjacent separator.

3. The electrode assembly of claim 1, wherein adjacent radical units are not combined with each other in the cell stack part, or are combined with each other in the cell stack part with a combining strength differing from a combining strength between the electrode and the separator in the radical unit.

4. The electrode assembly of claim 1,
   wherein the one kind of radical unit of (a) comprises a first radical unit having the four-layered structure or the repeating structure in which the four-layered structure is repeatedly stacked, and
   wherein each step of the cell stack part has a structure obtained by disposing the first radical units once or repeatedly.

5. The electrode assembly of claim 1,
   wherein the at least two kinds of radical units of (b) comprises:
   a second radical unit having the first electrode, the first separator, the second electrode, the second separator, the first electrode, and the first separator, which are sequentially disposed and integrally combined; and
   a third radical unit having the second electrode, the second separator, the first electrode, the first separator, the second electrode, and the second separator, which are sequentially disposed and integrally combined, and
   wherein the cell stack part has a structure in which the second radical unit and the third radical unit are alternately disposed.

6. The electrode assembly of claim 1, wherein the electrode is attached to an adjacent separator in each radical unit.

7. The electrode assembly of claim 6, wherein an entire surface of the electrode facing the adjacent separator is attached to the adjacent separator.

8. The electrode assembly of claim 6, wherein the attachment between the electrode and the separator is provided by applying pressure to the electrode and the adjacent separator or by applying pressure and heat to the electrode and the adjacent separator.

9. The electrode assembly of claim 6, wherein adhesive strength between the electrode and the adjacent separator in the radical unit is greater than adhesive strength between the radical units in the cell stack part.

10. The electrode assembly of claim 6,
    wherein the separator comprises a porous separator base material and a porous coating layer that is applied to an entire surface of one side or both sides of the separator base material,
    wherein the porous coating layer comprises a mixture of inorganic particles and a binder polymer, wherein the binder polymer binds and fixes the inorganic particles to each other, and
    wherein the electrode is attached to the adjacent separator by the coating layer.

11. The electrode assembly of claim 10,
    wherein the inorganic particles of the porous coating layer have a densely packed structure to form interstitial volumes between the inorganic particles over the overall coating layer, and
    wherein a pore structure is formed in the coating layer by the interstitial volumes that are defined by the inorganic particles.

12. The electrode assembly of claim 1,
    wherein the cell stack part further comprises a first auxiliary unit stacked on a terminal electrode that is an uppermost or a lowermost electrode,
    wherein, when the terminal electrode is a cathode, the first auxiliary unit is formed by stacking from the terminal electrode, a separator, an anode, a separator, and a cathode in sequence, and
    wherein, when the terminal electrode is an anode, the first auxiliary unit is formed by stacking from the terminal electrode, a separator and a cathode in sequence.

13. The electrode assembly of claim 12, wherein the cathode of the first auxiliary unit comprises:
    a current collector; and
    an active material coated on only one side facing the radical unit among both sides of the current collector.

14. The electrode assembly of claim 1,
    wherein the cell stack part further comprises a second auxiliary unit on a terminal separator that is an uppermost or a lowermost separator,
    wherein, when the electrode contacting the terminal separator is a cathode in the radical unit, the second auxiliary unit is formed by stacking from the terminal separator, an anode, a separator and a cathode in sequence, and
    wherein, when the electrode contacting the terminal separator is an anode in the radical unit, the second auxiliary unit is formed as a cathode.

15. The electrode assembly of claim 14, wherein the cathode of the second auxiliary unit comprises:
    a current collector; and
    an active material coated on only one side facing the radical unit among both sides of the current collector.

16. The electrode assembly of claim 1,
wherein the cell stack part further comprises a first auxiliary unit stacked on a terminal electrode disposed on an uppermost or a lowermost electrode,
wherein, when the terminal electrode is a cathode, the first auxiliary unit is formed by stacking from the terminal electrode, a separator and an anode in sequence, and
wherein, when the terminal electrode is an anode, the first auxiliary unit is formed by stacking from the terminal electrode, a separator, a cathode, a separator and an anode in sequence.

17. The electrode assembly of claim 16, wherein the first auxiliary unit further comprises a separator at an outer side of the anode.

18. The electrode assembly of claim 1,
wherein the cell stack part further comprises a second auxiliary unit on a terminal separator that is an uppermost or a lowermost separator,
wherein, when the electrode contacting the terminal separator is a cathode in the radical unit, the second auxiliary unit is formed as an anode, and
wherein, when the electrode contacting the terminal separator is an anode in the radical unit, the second auxiliary unit is formed by stacking from the terminal separator, a cathode, a separator, and an anode in sequence.

19. The electrode assembly of claim 18, wherein the second auxiliary unit further comprises a separator at an outer side of the anode.

20. The electrode assembly of claim 1,
wherein the cell stack part further comprises a second auxiliary unit stacked on a terminal separator that is an uppermost or a lowermost separator, and
wherein, when the electrode contacting the terminal separator in the radical unit is an anode, the second auxiliary unit is formed by stacking from the terminal separator, a first cathode, a separator, an anode, a separator, and a second anode in sequence.

21. The electrode assembly of claim 20, wherein the second cathode of the second auxiliary unit comprises:
a current collector; and
an active material coated on only one side facing the radical unit among both sides of the current collector.

22. The electrode assembly of claim 1,
wherein the cell stack part further comprises a second auxiliary unit stacked on a terminal separator that is an uppermost or a lowermost separator, and
wherein, when the electrode contacting the terminal separator is a cathode in the radical unit, the second auxiliary unit is formed by stacking from the terminal separator, a first anode, a separator, a cathode, a separator, and a second anode in sequence.

23. A polymer secondary battery cell, comprising:
the electrode assembly according to claim 1; and
a pouch case accommodating the electrode assembly.

24. The electrode assembly according to claim 1, wherein the fixing part directly contacts one or more electrodes of the cell stack part.

* * * * *